No. 691,206. Patented Jan. 14, 1902.
G. F. TADINI.
MOTOR VEHICLE.
(Application filed Oct. 4, 1901.)
(No Model.)
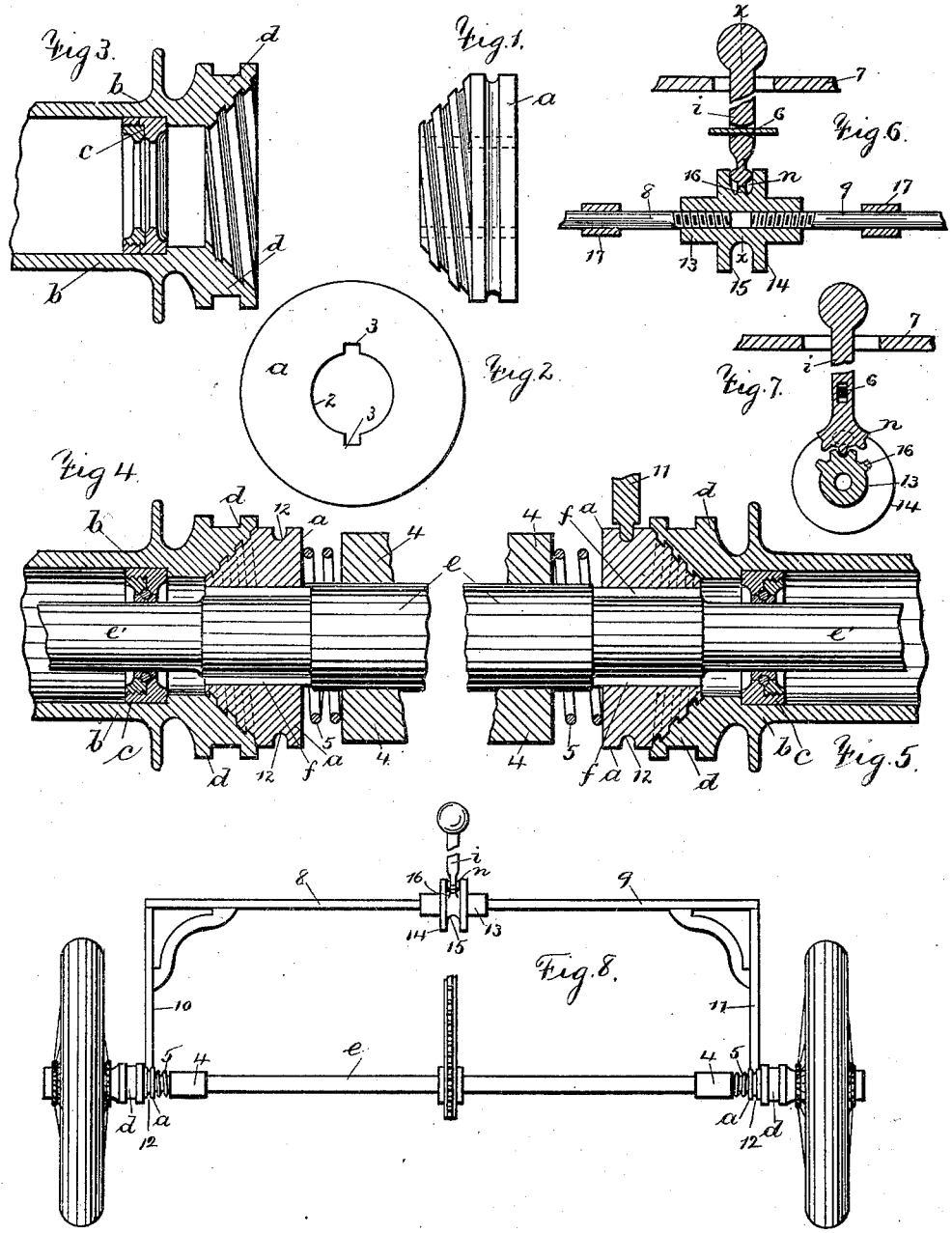

UNITED STATES PATENT OFFICE.

GEROME F. TADINI, OF NEW YORK, N. Y.

MOTOR-VEHICLE.

SPECIFICATION forming part of Letters Patent No. 691,206, dated January 14, 1902.

Application filed October 4, 1901. Serial No. 77,533. (No model.)

*To all whom it may concern:*

Be it known that I, GEROME F. TADINI, a subject of the King of Italy, residing in the borough of Manhattan, city, county, and State of New York, have invented an Improvement in Motor-Vehicles, of which the following is a specification.

My invention relates to motor-vehicles, and particularly to that part comprising the means whereby the driving-axle is connected to its wheels and means for controlling the said connection.

Heretofore various devices have been employed to compensate for the different velocities attained by the wheels on the driving-axle when the vehicle is rounding curves. Devices have also been constructed using a continuous axle and in which either the outer or inner wheel is freed from the driving-axle when the vehicle is rounding curves. My invention relates to this latter class of devices; and it consists in an improved connection between the driving-axle and the wheels wherein the outer wheel is automatically freed by its greater velocity in rounding corners and means whereby, if desirable, the outer wheel may be caused to remain clutched and the inner wheel freed.

In carrying out my invention I employ threaded cone-shaped members on the axle, and the inner sides of the hubs of the wheels are adapted to receive the said cone-shaped members to clutch and unclutch the wheels from the shaft, this being accomplished through means operated by a foot-lever, as hereinafter described.

In the drawings, Figure 1 is an end elevation of the threaded cone-clutch. Fig. 2 is an end view of the same. Fig. 3 is a partial section through the hub of the wheel used on the left side of the vehicle. Fig. 4 is a partial section showing the hub of the wheel and cone used on the left side of the vehicle with the axle in place. Fig. 5 is a similar view showing the hub and cone of the wheel used on the right side of the vehicle. Fig. 6 is a section of the foot-lever and connecting parts for operating the clutches. Fig. 7 is a transverse section on line $x\,x$, Fig. 6; and Fig. 8 is an elevation of the driving-axle and wheels and controlling mechanism.

$a$ represents a truncated cone having a cylindrical base, the surface of the conical portion being cut into a screw-thread, preferably a square-section thread. This cone $a$ has a hollow circular center 2, which is provided with grooves 3 at diametrically opposite points. The cone used with the wheel on the left-hand side is provided with a right-hand thread and the cone on the opposite side with a left-hand thread.

$b$ represents the hubs of the wheels, having suitable bearings $c$. The inner ends of the hubs are extended and enlarged, as at $d$, and the bores of the enlarged portions are tapering and provided with interior threads adapted to be engaged with those of the respective cones.

The driving-axle $e$ is provided with splines $f$ at diametrically opposite points adjacent to the reduced end portions $e'$, which pass through the bearings of the wheels. The cones $a$ fit over the axle at the portions where the splines $f$ are, the said splines passing into the grooves 3 of the cones, the joints between the axle and the cones being snug, but sufficiently loose to permit the cones to slide slightly on the axle.

The axle-bearings 4, supporting the body of the vehicle, are conveniently placed with their outer ends adjacent to the faces of the cone-clutches $a$. Helical springs 5 surround the axle between the cones and the bearing devices 4, the springs tending to keep the cones in their proper normal positions.

It will now be apparent that when the vehicle is rounding a curve the increased speed of the outer wheel over the speed of the axle, due to its greater travel, will cause the wheel to become disengaged automatically from its clutch, and the said wheel will then be free to turn on its bearing independently of the speed of the axle, and the driving will all be done through the inside wheel. When the vehicle returns to a straight path, the freed wheel will again engage with its clutch, and the driving power will be transmitted to both wheels alike. But when in rounding corners the driving is done from the inside wheel, the driving power must necessarily be decreased to maintain the speed of the vehicle, because otherwise the vehicle speed would be increased, due to the shorter travel of the inside wheel. An increased speed in rounding corners is not always advantageous, and a decreased speed without changing the power is generally desirable. In order to obtain this result and also to keep both wheels clutched if occasion so demands, I employ a lever $i$, pivoted to the vehicle-body at 6 and carrying a toothed segment $n$.

The lever $i$ extends through the floor 7 of the vehicle-body and is capable of being moved on its pivot in a vertical plane or laterally. I provide bars 8 and 9, which are connected to the cones $a$ by other bars 10 and 11, the ends of bars 10 and 11 being adapted to fit into circumferential recesses 12 in the cones $a$. The adjacent ends of the bars 8 and 9 are provided, respectively, with right and left hand threads, and these ends pass into a collar 13, adapted to receive them. On the collar 13 and preferably integral therewith is a broad flange 14, having a circumferential recess 15, a portion of the base of which latter is provided with teeth 16. The teeth of the segment $n$ mesh with the teeth 16 in the recess 15, and the lever $i$ is also provided with a surface bearing upon the upper part of the recess 15. The rods 8 and 9 should be supported in suitable bearings 17, in which they are free to turn, and the lever and connections may be maintained in their normal positions by means of a spring or otherwise. From this construction it will be readily apparent that by moving the top of the lever forward the bars 8 and 9 will be moved outward, binding both clutches to the hubs of their respective wheels. By moving the top of the lever backward both wheels will be freed from their clutches, whereas in moving the lever to the right the left-hand wheel will be clutched and the right-hand wheel freed and in moving the lever to the left the right-hand wheel will be bound and the left-hand wheel freed.

The above-described operation of the parts becomes possible by first slowing the motor and driving-shaft and causing the wheels to momentarily turn faster than the axle speed to free the wheels, after which either wheel may at pleasure be clutched by the herein-described mechanism and the motor again be brought up to speed. Therefore in rounding corners with motor-vehicles embracing my present improvements the outside wheel of the driving-shaft is automatically freed and the driving done through the inside wheel, or the inside wheel may be freed and the vehicle driven by the outside wheel, or both wheels may be kept clutched at pleasure, which latter condition is necessary in reversing the vehicle.

I claim as my invention—

1. In a motor-vehicle, the combination with a one-piece driving-axle and wheels therefor, of threaded cone-clutch connections between the said axle and the hubs of said wheels whereby in rounding curves the outer of said wheels will be freed by its increased velocity, substantially as specified.

2. In a motor-vehicle, the combination with a one-piece driving-axle and wheels therefor, of threaded cone-clutch connections between the said axle and the hubs of said wheels whereby in rounding curves the outer of said wheels will be freed by its increased velocity, substantially as specified.

3. In a motor-vehicle the combination with a one-piece driving-axle, of threaded cone-clutches on said axle, means permitting longitudinal movement and preventing the said clutches from turning on the said axle, wheels on the said axle the inner ends of the hubs of which are enlarged to receive and are adapted to be engaged by the said clutches, and means for determining the positions of the said clutches on the said axle, substantially as set forth.

4. In a motor-vehicle, the combination with a one-piece driving-axle, of threaded cone-clutches on said axle, means permitting longitudinal movement and preventing the said clutches from turning on the said axle, wheels on the axle, the inner ends of the hubs of which are enlarged to receive and are adapted to be engaged by the said clutches, and means for shifting and operating the clutches upon the freeing of the wheels, substantially as specified.

5. In a motor-vehicle, the combination with a one-piece driving-axle, of threaded cone-clutches on said axle, means permitting longitudinal movement and preventing the said clutches from turning on the said axle, wheels on the axle, the inner ends of the hubs of which are enlarged to receive and are adapted to be engaged by the said clutches, and means for keeping both wheels clutched, substantially as specified.

6. In a motor-vehicle, the combination with a one-piece driving-axle, of threaded cone-clutches on said axle, means permitting longitudinal movement and preventing the said clutches from turning on the said axle, wheels on the axle, the inner ends of the hubs of which are enlarged to receive and are adapted to be engaged by the said clutches, and means for freeing one wheel and clutching the other wheel, and also for keeping both wheels clutched at pleasure, substantially as specified.

7. In a motor-vehicle, the combination with a one-piece driving-axle, of threaded cone-clutches on said axle, means permitting longitudinal movement and preventing the said clutches from turning on the said axle, wheels on the axle, the inner ends of the hubs of which are enlarged to receive and are adapted to be engaged by the said clutches, a pivoted foot-lever, a toothed segment carried by said lever, bars connected to the said clutches the inner ends of the bars being provided with right and left hand threads respectively, a collar fitting over the said inner ends of the bars the said collar having a circumferentially-recessed flange, at the bottom of which are teeth meshing with those of the toothed segment, and means for operating the said lever whereby either of the wheels or both of the wheels may be locked at pleasure, substantially as set forth.

Signed by me this 17th day of September, 1901.

GEROME F. TADINI.

Witnesses:
GEO. T. PINCKNEY,
BERTHA M. ALLEN.